United States Patent [19]

Schmidt et al.

[11] Patent Number: 5,550,702

[45] Date of Patent: Aug. 27, 1996

[54] ADAPTIVE DUTY-CYCLE LIMITING FOR OVERLOAD PROTECTION OF INTEGRATED CIRCUITS

[75] Inventors: Thomas A. Schmidt, Dallas; Roy A. Hastings, Allen, both of Tex.

[73] Assignee: Texas Instruments Incorporated, Dallas, Tex.

[21] Appl. No.: 342,528

[22] Filed: Nov. 21, 1994

[51] Int. Cl.$^6$ .................................................. H02H 5/00
[52] U.S. Cl. .............................. 361/103; 361/93; 361/115
[58] Field of Search ................................ 361/23, 24, 25, 361/93, 103, 115; 318/599, 257

[56] References Cited

U.S. PATENT DOCUMENTS 4,599,548  7/1986  Schultz ................................. 318/599

*Primary Examiner*—Jeffrey A. Gaffin
*Assistant Examiner*—Stephen Jackson
*Attorney, Agent, or Firm*—Warren L. Franz; W. James Brady, III; Richard L. Donaldson

[57] ABSTRACT

A technique for which integrated circuit duty-cycle control or pulse width current limiting adaptively responds to the load, allowing a brief inrush current event upon startup of the load, while restricting long-term power dissipation to a lower value. Upon sensing an overcurrent condition, a duty cycle control circuit causes the output to be placed into a high duty-cycle mode of operation to provide sufficient power to the load. A thermal sense circuit provides additional control because if the overcurrent condition continues and the junction temperature rises to the thermal sense trip point, the duty cycle control circuit places the output in a lower duty-cycle mode.

14 Claims, 5 Drawing Sheets

5,550,702

ADAPTIVE DUTY-CYCLE LIMITING FOR OVERLOAD PROTECTION OF INTEGRATED CIRCUITS

FIELD OF THE INVENTION

The invention relates generally to integrated circuits and more particularly to protection circuits for integrated circuits.

BACKGROUND OF THE INVENTION

Integrated circuits often incorporate power devices designed to drive external loads. External loads may exhibit fault conditions, such as internal short circuits or open circuits, or impedance changes due to aging or component failure. Certain fault conditions may place electrical overstresses upon the integrated circuit which is driving the faulty load. For example, suppose an integrated circuit $IC_1$ of FIG. 1 contains a series-pass element $M_1$ which is connected between a low-impedance voltage source $V_{in}$ and a resistive load $R_L$. Under normal operating conditions, the series-pass element $M_1$ is either on or off, and in neither case does the integrated circuit dissipate large amounts of power. If $M_1$ is on, there will be little voltage across it, and if it is off, then little current will flow through it. Consequently, thermal dissipation within the integrated circuit is limited to a value which is nondestructive. However, if the load should fail, and consequently exhibit a low resistance to the flow of current, a potentially destructive condition occurs within the series-pass element $M_1$. Because the resistance of this element is now large when compared to that of the faulty load, the majority of the voltage drop is across $M_1$, and large amounts of current flow. The junction temperature of the integrated circuit will rapidly rise, and unless the fault is quickly removed, the integrated circuit will be destroyed.

Prior-art implementations of integrated circuit power drivers were typically protected by means of current limiting. A typical current limiting technique involves the placement of a current sense element in series with the series pass element, thereby allowing the integrated circuit to sense the flow of current through this device. If an excessive current flow is detected, the series pass device is disabled, protecting the circuit. This technique has the disadvantage of requiring an external reset, since with the series-pass element disabled, the integrated circuit cannot tell if the fault has cleared. Since many loads may exhibit momentary short-circuiting, this technique is not widely applicable. Techniques have been developed which monitor the load and restore normal operation when the fault is cleared. Some of these techniques rely upon linear regulation of the series-pass element, while others rely upon digital switching of the pass element.

An typical prior-art linear current limit circuit is shown in FIG. 2. A NMOS power device $M_1$ is driven by a CMOS inverter $IV_1$ through a limiting resistor $R_1$. The current flowing through the power device is sensed by $R_2$. When the voltage across $R_2$ is sufficient to turn NPN transistor $Q_1$ on, this transistor will pull down upon the gate of $M_1$. Because of the presence of resistor $R_1$, the voltage at the gate of $M_1$ will drop, causing the voltage $V_{out}$ to also drop. Because the load now has a lower voltage across it, the current drawn by the load will decrease. At some point, the negative feedback around $Q_1$ will bring the circuit into equilibrium, with a constant current flowing through the load. The constant current limit is set by adjusting the value of resistor $R_2$.

Linear current limit circuits are often supplemented by overtemperature sensors integrated onto the integrated circuit. Due to the relatively long thermal time constants of the silicon chip, a thermal sensor cannot be relied upon as a sole means of protection. By the time the thermal sensor has detected a fault, excess power may have resulted in localized overheating and device failure. However, a thermal sensor can be combined with a linear current limit to provide a superior protection scheme. In such a scheme, the linear current limit is deliberately set to a relatively high current value, one which would eventually lead to overheating of the integrated circuit.

Some integrated circuits have multiple output drivers, or channels. These integrated circuits often require that each channel have independent protection circuitry, so that if a load driven by one channel fails, the other channels will continue to operate normally. This has historically been implemented using independent current limits and thermal shutdown circuits for each channel; this solution requires careful layout of the thermal sense elements to minimize thermal interactions between different channels which are integrated onto a common substrate.

Unfortunately, a linear current limit circuit is often difficult to implement. The feedback loop containing $Q_1$ is a high-gain loop, and will tend to oscillate unless it is stabilized. This circuit may also interfere with the driving capabilities of the inverter $IV_1$, due to the resistance $R_1$ which is incorporated as a part of the current limit circuit. In addition, independent thermal shutdown circuits become increasingly difficult as output specific on resistance, Rsp, also known as Rdson/Area becomes smaller. As die area shrinks, thermal interaction between channels increases and the integrity of independent thermal shutdown becomes questionable. For this reason, digital techniques for overcurrent protection have been developed. These digital solutions prevent an output in a fault condition from heating an adjacent output, causing an inadvertant shutdown of an output not exhibiting a fault condition. A typical digital current limiting technique uses pulse-width-modulation (PWM) to limit the power dissipation through the series-pass element.

FIG. 3 shows a typical digital current limit circuit. A current sense resistor $R_1$ is inserted in the current path through power transistor $M_1$. A voltage is developed across this resistor which is proportional to the current flowing through the power device. This voltage is sensed by comparator $C_1$. When the voltage exceeds the voltage of the offset voltage source $V_{ofs}$, the output of comparator $C_1$ goes high, indicating an overcurrent condition. This sets flip-flop $FF_1$, whose non-inverting output Q now goes high. T1 is a $2^n$ Ripple Counter made up of n D Flip/Flops with an active low clear (CLRZ). When CLRZ is low, Qmsb of T1 is low. T1 is clocked by a constant frequency pulse train on input OSC. T2 is a $2^x$ Ripple Counter made up of x D Flip/Flops with an active low preset (PREZ).

When PREZ is low, Qmsb of T2 is high. T2 is also clocked by the input OSC. When Q of FF1 goes high, T1 and T2 are enabled. The number of flip/flops in T2 and T1 is chosen such that x>n. When T1 counts to $2^n$ clocks of input OSC, a monostable, MONO1 is fired, clocking the input CLK of FF2. This causes the inverting output of FF2, QZ, to go low. The gate drive G1 to M1 is disabled, causing M1 to turn off. T2 continues to count OSC cycles, and when it reaches $2^x$ counts, Qmsb of T2 goes low, clearing FF1 and FF2. This causes Q of FF1 to go low, and QZ of FF2 to go high. T1 and T2 are cleared and preset respectively, and gate drive, G1 is once again enabled. FIG. 4 represents a timing diagram demonstrating the duty cycle control of M1. If a short circuit condition is maintained, the output M1 is essentially turned off and on with a duty cycle equal to $2^n/2^x$. By setting this oscillator's duty cycle to a small value (perhaps 1%), the power dissipation in M1 can be limited to a safe value. When the power transistor is on with a short circuit condition, a very large current will flow, limited only by the drive capacity of transistor $M_1$ (for a MOS transistor, this means that current flow is limited only by the rdson of the transistor). This current would very quickly overheat the power device and destroy it, but the duty cycle control will disable the power transistor before overheating reaches a critical level. The low duty cycle then allows the power transistor time to cool down before another pulse of power is delivered. If a sufficiently small duty cycle is generated, this circuit can indefinitely operate in current limit without thermal runaway.

Duty-cycle control limits are not suitable for driving certain types of loads, such as incandescent lamps, which exhibit a time-dependent response. These loads require a large initial current in order to achieve a lower, steady-state operating current level. If the initial current level (called the inrush current) exceeds the current limit trip-point of a PWM current sense scheme, the driver will go into overcurrent detect mode and will begin to pulse-width-modulate the load. This may limit power flow into the load to a value insufficient for the load to heat up and achieve its lower, steady-state operating current level in the required time. In this case, the duty cycle output protection circuit prevents the integrated circuit from operating normally, which is clearly an undesirable circumstance.

What is needed is a more sophisticated form of duty-cycle control.

SUMMARY OF INVENTION

An over current protection scheme for integrated circuits having multiple outputs employs a global thermal sense circuit and a current sense circuit which is connected to a duty cycle control logic circuit. When over current is sensed, the duty cycle control logic circuit places the output in a high duty cycle mode to provide sufficient power to the load. If the over current condition persists and the junction temperature rises to the thermal sense trip point, the duty cycle control logic circuit places the output in a lower duty cycle mode. The scheme thus can adaptively respond to the load, allowing a brief inrush current event upon startup of the load, while restricting long-term power dissipation to a lower value. Loads such as incandescent bulbs can be turned on (heated up) quickly while still protecting the integrated circuit in unison with the current sense duty cycle circuitry. Multiple outputs can drive incandescent bulbs normally and also be protected against short circuit conditions.

DETAILED DESCRIPTION OF PREFERRED EMBODIMENT

As shown in the following description, the invention provides a method for protecting power devices on an integrated circuit from destructive overloads, while providing short-duration high-current drive to satisfy the inrush requirements of time-dependent loads such as incandescent lamps. The invention can be applied to integrated circuits which contain multiple independent channels, as well as integrated circuits which incorporate only one power device. In the case where the integrated circuit implements multiple channels, each channel can be given independent protection, should this be required for the application.

The primary means of protection is pulse-width-modulated current limiting circuitry (duty-cycle control circuitry) provided on a per-channel basis. This circuitry will be supplemented by a secondary protection scheme which will limit long-term overload currents to a level which will not damage the integrated circuit.

Figure 5:
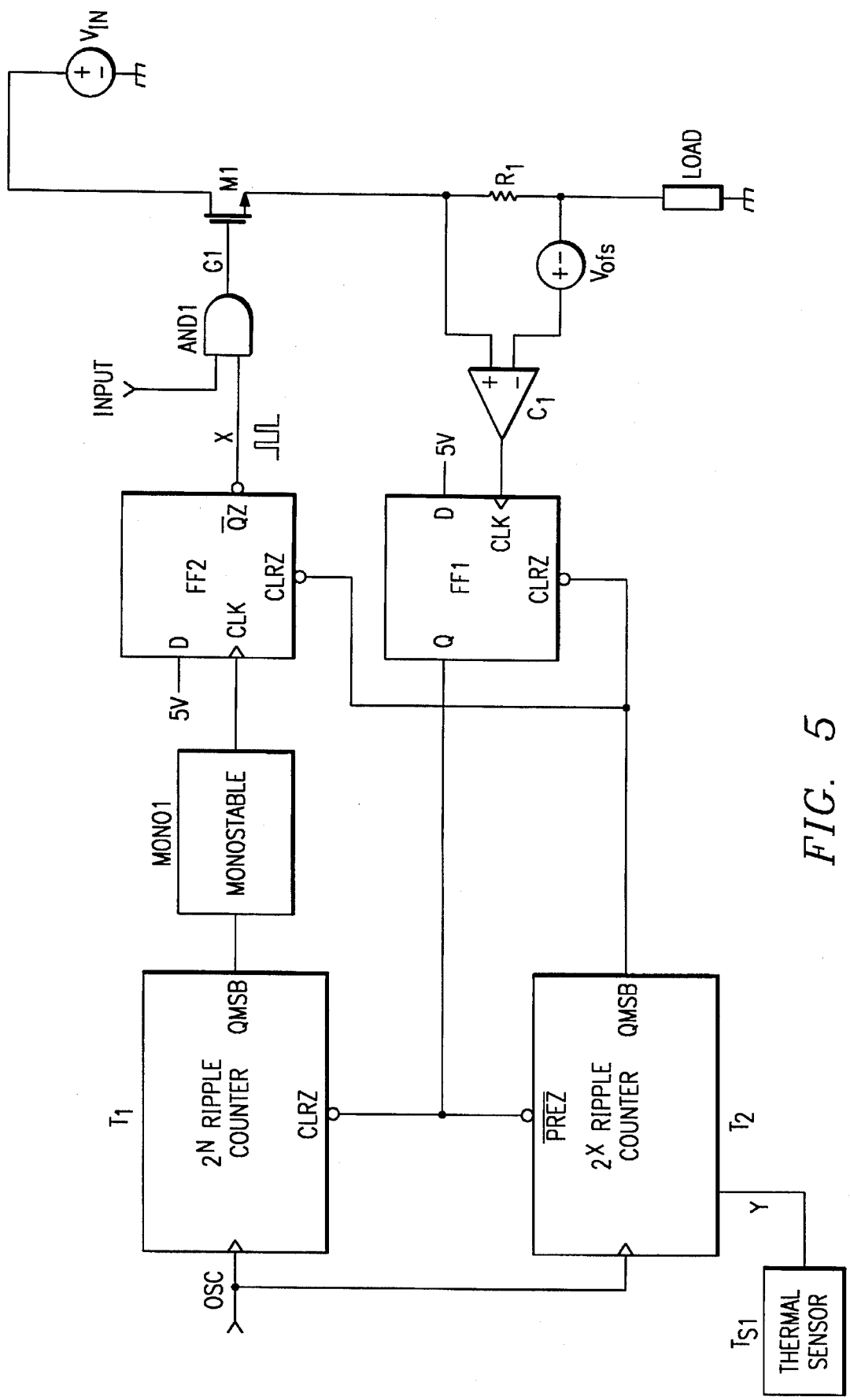
FIG. 5 is a current limit circuit in accordance with the invention.

FIG. 5 shows a conceptual block diagram of how the invention operates. The integrated circuit incorporates a series-pass element $M_1$, here shown as an NMOS power transistor. Alternative implementations include PMOS power transistors, bipolar transistors and other power switching elements. Current flowing through the power transistor is sensed by a current sense element. In this circuit, the current sense element is a resistor $R_1$ inserted in the source lead of the power transistor. Alternative implementations for current sense elements exist, including schemes which use the $rds_{on}$ of a MOS transistor as a sense resistor. The invention is equally applicable to any current sensing scheme, regardless of the exact details of the implementation.

A voltage is developed across this resistor which is proportional to the current flowing through the power device. This voltage is sensed by comparator $C_1$. When the voltage exceeds the voltage of the offset voltage source $V_{ofs}$, the output of comparator $C_1$ goes high, indicating an overcurrent condition. This sets flip-flop $FF_1$, whose non-inverting output Q now goes high. T1 is a $2^n$ Ripple Counter made up of nD Flip/Flops with an active low clear (CLRZ). When CLRZ is low, Qmsb of T1 is low. T1 is clocked by a constant frequency pulse train at input OSC. T2 is a $2^x$ Ripple Counter made up of D Flip/Flops with an active low preset (PREZ). When PREZ is low, Qmsb of T2 is high. T2 is clocked by the input OSC. When Q of FF1 goes high, T1 and T2 are enabled. The number of flip/flops in T2 and T1 is chosen such that x>n. When T1 counts to $2^n$ clocks of input OSC, a monostable, MONO1 is fired, clocking the input CLK of FF2. This causes the inverting output of FF2, QZ, to go low, disabling the gate drive, G1 by causing it to go low. T2 continues to count OSC cycles, and when it reaches $2^x$ counts, Qmsb of T2 goes low, clearing FF1 and FF2. This causes Q of FF1 to go low, and QZ of FF2 to go high. T1 and T2 are cleared and preset respectively, and gate drive, G1 is once again enabled. Therefore, this scheme ensures that the duty cycle of $M_1$ will be limited to the duty cycle of signal X when the part experiences a fault condition.

The duty cycle control signal, X, is generated by timing intervals in ripple counter T1 and T2. The pulse width, $t_{pw}$, is determined by T1 and the period, τ, is determined by T2. The duty cycle of signal X is given by:

$$d = t_{pw}/\tau \quad [1]$$

The time-average current delivered to the load, $I_{avg}$, is proportional to the duty cycle, d, and the peak instantaneous current delivered to the load, $I_{pk}$:

$$I_{avg} = d \times I_{pk} = I_{pk} \times t_{pw}/\tau \quad [2]$$

Therefore, by adjusting the pulse width of T1, the average current delivered to the load can be controlled. By setting T1 to deliver a suitable pulse width (i.e, a higher duty cycle such as, for example, a duty-cycle in about the 8 to 12% range), the circuit can provide sufficient current to satisfy the inrush requirements of the load. However, the average current passing through the power transistor $M_1$ will still be limited by the duty cycle imposed by T1 and T2. Thus, if the load were to become shorted, the power dissipation within the power device $M_1$ would become:

$$P = \frac{d \cdot Vin^2}{rds_{on}}$$

where $rds_{on}$ is the on-resistance of transistor $M_1$. By adjusting the duty cycle to a suitable value for a given value of input voltage and transistor $rds_{on}$, power dissipation within the integrated circuit can be limited to a value which will not be immediately destructive. However, because the resistance of the power switch is small compared to the resistance of the load, average power dissipation within the integrated circuit will still be quite large, even with duty cycle control. If this power dissipation were allowed to continue indefinitely, the temperature of the integrated circuit would rise, and it could eventually exceed the safe operating limits for the part.

Figure 1:
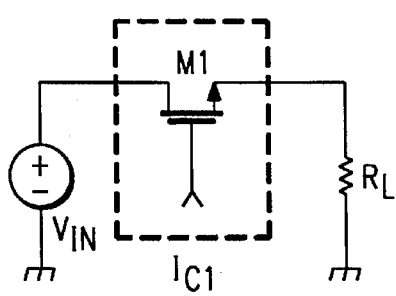
FIG. 1 shows a prior-art power device integrated circuit.
Figure 2:
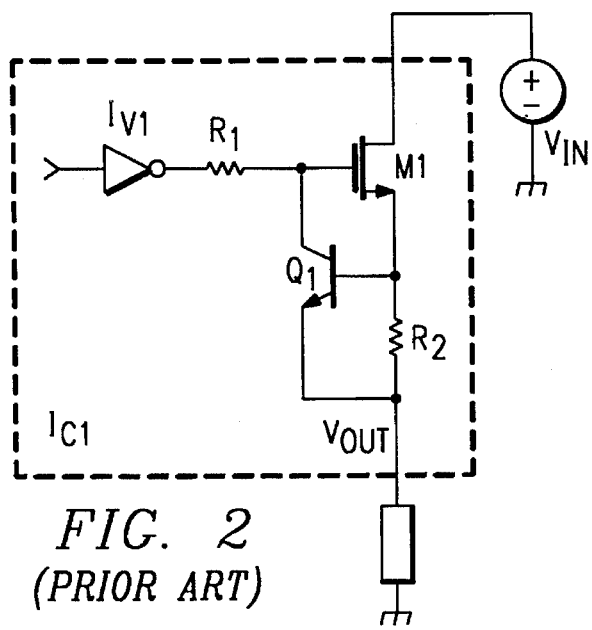
FIG. 2 shows a prior-art linear current limit circuit for the circuit of FIG. 1.
Figure 4:
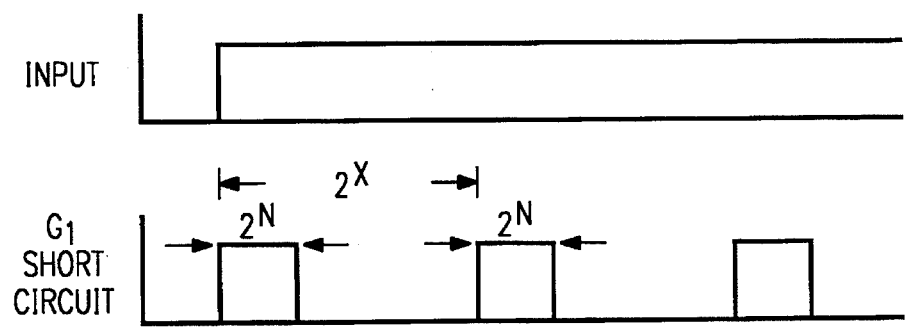
FIG. 4 is a timing diagram for the circuit of FIG. 3.
Figure 6:
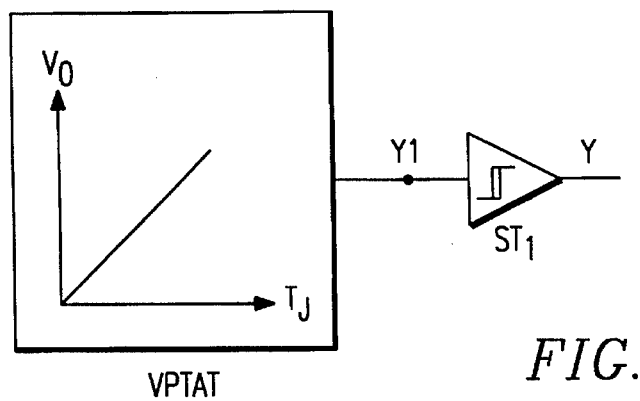
FIG. 6 is a thermal sense circuit usable with the circuit of FIG. 5.
Figure 3:
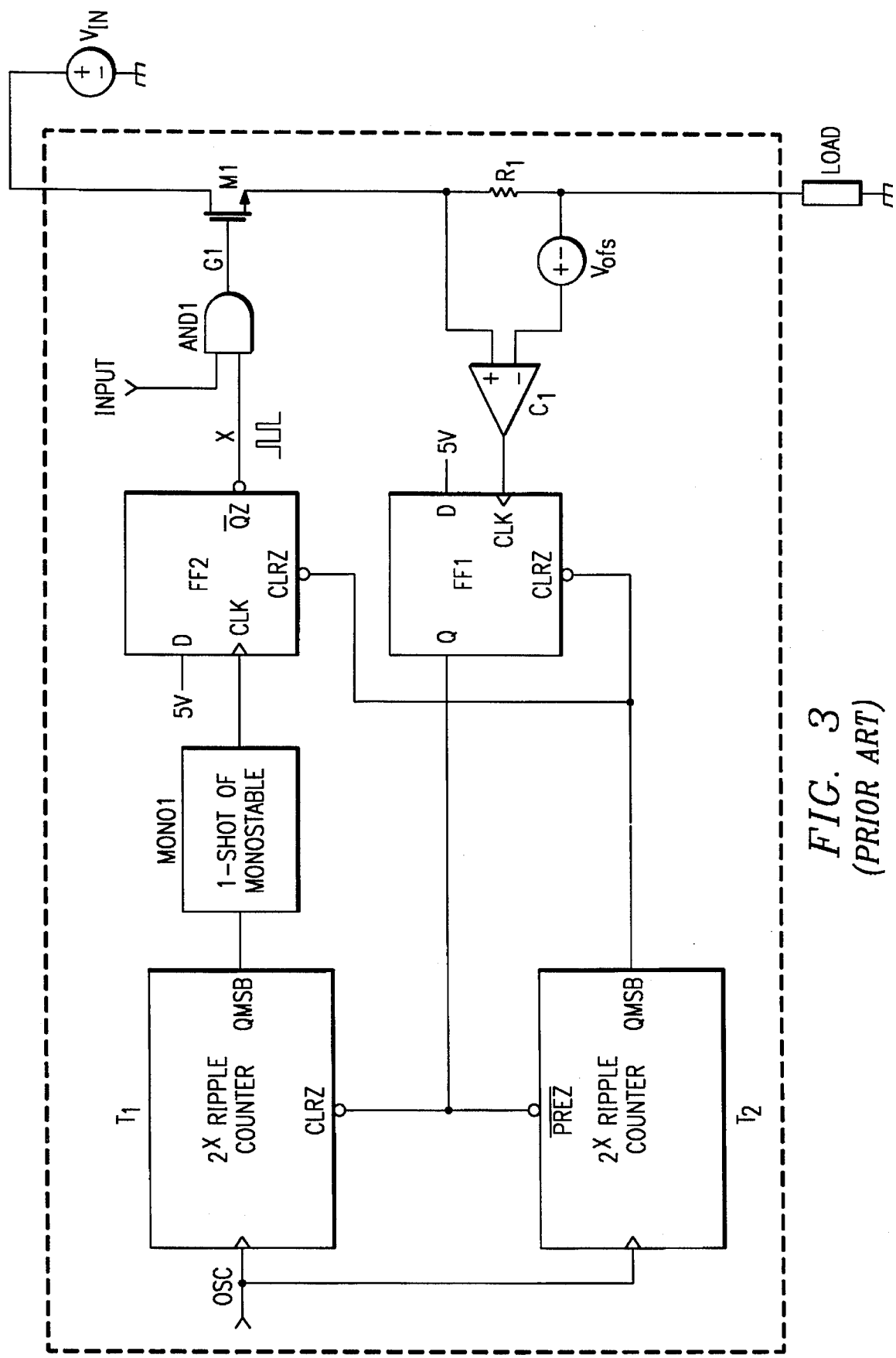
FIG. 3 shows a prior-art digital current limit circuit for the circuit of FIG. 1.

Therefore, the invention includes a thermal sense circuit $TS_1$ which monitors the temperature of the die. This sensor can then adjust the number of counts in T2 to further restrict power dissipation within the die to a safe level, preventing runaway thermal failure. The output of the thermal circuit can be utilized to increase the number of counts in T2, for example, by increasing the counts from $2^x$ to $2^{x+1}$. This would cause the duty cycle of signal X to be cut in half. Additional counts can be added to sufficiently reduce the duty-cycle to protect the IC. In this case, control signal Y might be a binary signal, with a logic one indicating a narrow pulse width (yielding, for example, a 1% duty cycle) and a logic zero might indicate a wider pulse width (yielding, for example, an 8% duty cycle). A thermal sense circuit which could generate control signal Y for this scheme is shown in FIG. 6. The thermal sense element is a circuit which generates a voltage proportional to absolute temperature (VPTAT). This circuit would then generate a voltage which is linearly proportional to temperature. This voltage is then sent to a Schmitt trigger $ST_1$. So long as the voltage is beneath an upper threshold voltage, $V_H$, corresponding to an upper threshold temperature $T_H$, the output would be low, allowing the longer pulse width. Once the voltage exceeds $V_H$, the Schmitt trigger is tripped, generating a high output to reduce the pulse width generated by the one-shot. Now the voltage must drop back below a lower voltage threshold $V_L$, corresponding to a lower temperature limit $T_L$, before the Schmitt trigger returns the output to a low voltage. This circuit has the effect of providing thermal hysteresis (equal to $T_H - T_L$), which prevents 'chattering' between the two values of duty cycle.

Figure 7:
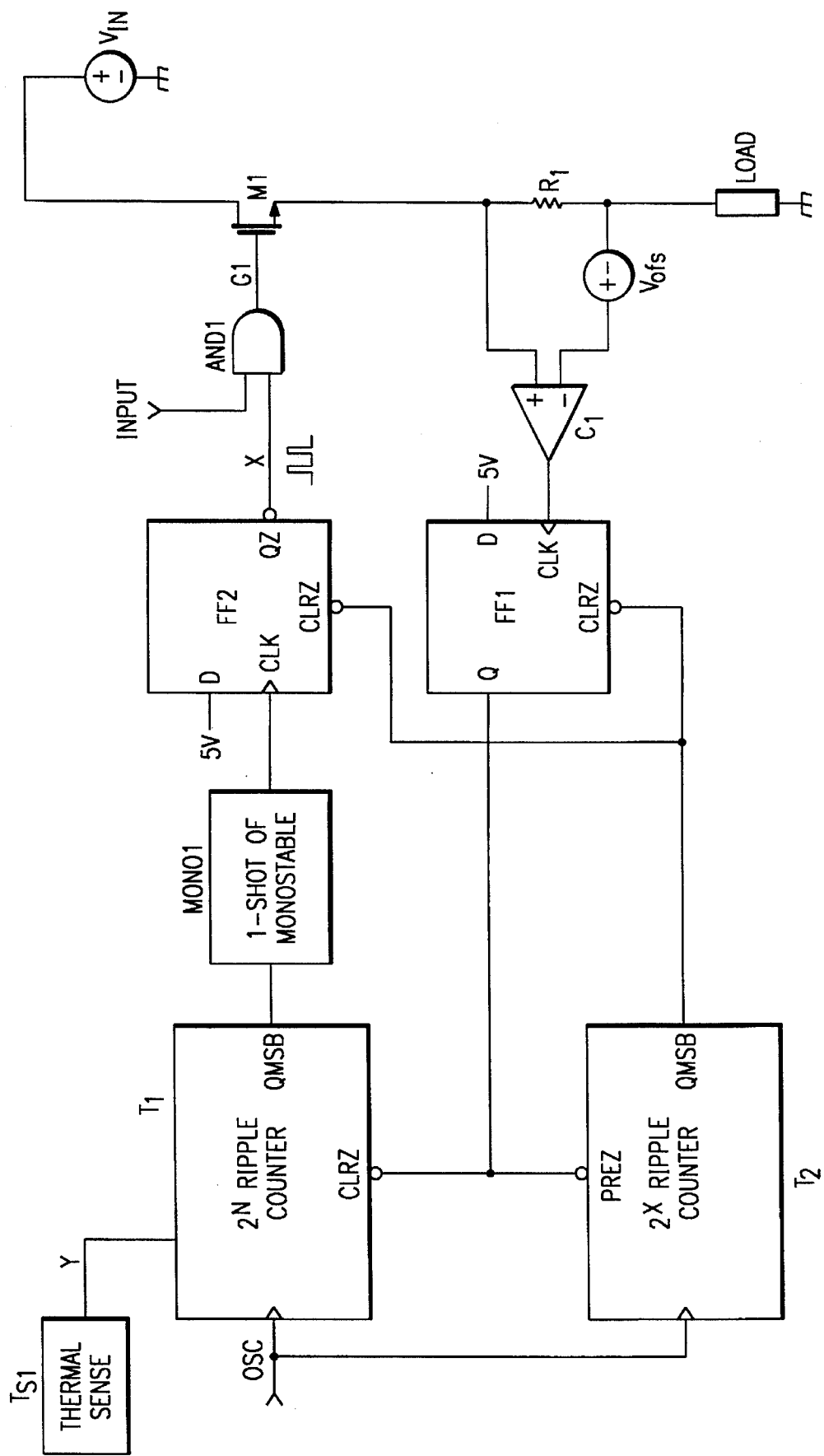
FIG. 7 is an alternative embodiment of current limit circuit in accordance with the invention.

FIG. 7 demonstrates an alternate embodiment of the invention. In FIG. 7, the thermal sense circuit output Y feeds into ripple counter T1. The output Y can be used as a binary signal decreasing the number of counts in T1 from $2^n$ to $2^{n-1}$ or less. By decreasing the number of counts in T1, the pulse width of duty cycle control signal X is decreased, for example from 8% to 1%.

Figure 8:
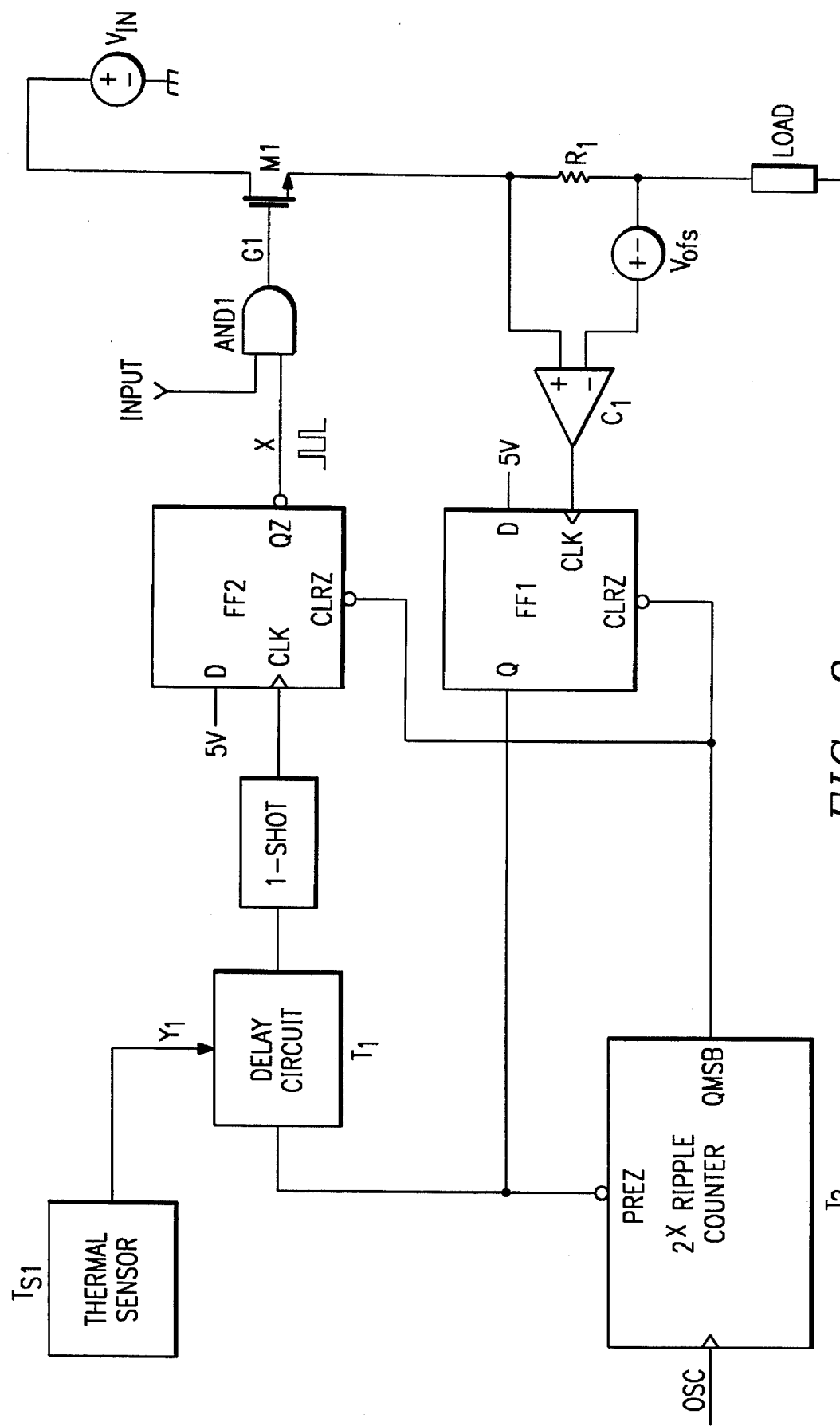
FIG. 8 is another embodiment of current limit circuit in accordance with the invention.

FIG. 8 demonstrates another embodiment of the invention. In this scheme, the pulse width is determined by an analog delay circuit, T1. Similar to the other embodiments, a voltage is developed across resistor R which is proportional to the current flowing through the power device M1. This voltage is sensed by comparator $C_1$. When the voltage exceeds the voltage of the offset voltage source $V_{ofs}$, the output of comparator $C_1$ goes high, indicating an overcurrent condition. This sets flip-flop $FF_1$, whose non-inverting output Q now goes high. T2 is a $2^x$ Ripple Counter made up of x D Flip/Flops with an active low present (PREZ). When PREZ is low, Qmsb of T2 is high. T2 is clocked by the input OSC. When Q of FF1 goes high, the delay circuit T1 and ripple counter T2 are enabled. When T1 delay circuit times out, it clocks FF2. This causes the inverting output of FF2, Qz to go low, disabling the gate drive, G1 by causing it to go low. T2 continues to count OSC cycles, and when it reaches $2^x$ counts, Qmsb of T2 goes low, clearing FF1 and FF2. This causes Q of FF1 to go low, and QZ of FF2 to go high. Therefore, this scheme also ensures that the duty cycle of $M_1$ will be limited to the duty cycle of signal X when the part experiences a fault condition.

By use of an analog delay circuit, the thermal sense input can be used as an analog voltage input to the delay circuit. The thermal sense circuit provides a voltage linearly proportional to temperature, which forms control signal Y1. The delay circuit $T_1$ is then constructed so as to produce a delay time inversely proportional to temperature. A VPTAT circuit could be used as the thermal sensor, and a charge-discharge oscillator can be set so as to produce a pulse width inversely proportional to temperature, thus serving as analog delay circuit T1. This arrangement can be used to form a negative-feedback control loop, for as the temperature of the die increases, the thermal sensor output voltage will rise, forcing the delay circuit to produce a narrower pulse, which in turn restricts the average current flowing through power device $M_1$, reducing the device temperature. Schemes of this sort will normally exhibit a time lag due to thermal inertia of the die, which can be seen as introducing a phase lag in the control loop. Compensation may be necessary if the phase lag is excessive, or otherwise oscillations may occur during current limit. Compensation can be introduced by (for example) inserting a low-pass R-C filter network into the thermal sensor, so as to produce a dominant pole in the s-domain transfer function of the loop, thus ensuring unconditional stability.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention. For example, the protection schemes would also apply to PMOS devices utilized as high side series switch, or power NMOS devices utilitzed in Low side drive applications. In every case, the power switch is protected from overload conditions by means of pulse-width modulating its conduction time whenever the instantaneous current exceeds a threshold value. In addition, the pulse width used to modulate the conduction time is itself a function of the die temperature, as monitored by a thermal sensor, plus possibly other inputs. The addition of a thermal sense circuit ensures that the die can be protected from thermal destruction by adjustment of the duty cycle of the power switch while allowing a larger duty cycle to be used to start up a time-dependent load such as an incandescent lamp.

What is claimed is:

1. A method of adapting the current flow duty-cycle of an output driver to protect the output driver, comprising the steps of:

sensing an overcurrent condition in the current flow of the output driver; setting the duty-cycle of the output driver to flow the current at a given on-off duty-cycle upon sensing the overcurrent condition;

while flowing the current at the given duty-cycle, monitoring the junction temperature of the output driver; and controlling the output driver to flow the current at a lower on-off duty-cycle, less than the given on-off duty-cycle, if the junction temperature rises above a thermal sense trip point during continuation of the sensed overcurrent condition.

2. The method of claim 1 wherein the step of placing the duty-cycle of the output driver into a high duty-cycle mode upon sensing the overcurrent condition comprises the step of using a timing element to adjust a pulse width of the output driver.

3. The method of claim 2 wherein the timing element is a ripple counter.

4. The method of claim 2 wherein the timing element adjusts the conduction time of the output driver thereby setting the duty-cycle of the output driver.

5. The method of claim 4 wherein the step of placing the duty-cycle into a lower duty-cycle mode if the junction temperature rises above the thermal sense trip point comprises the step of changing the duration set by the timing element, thereby changing the conduction interval of the output driver which changes the duty-cycle of the output driver.

6. The method of claim 2 wherein the timing element adjusts the time between conduction intervals of the output driver thereby setting the duty-cycle of the output driver.

7. The method of claim 6 wherein the step of placing the duty-cycle into a lower duty-cycle mode if the junction temperature rises above the thermal sense trip point comprises the step of changing the duration set by the timing element thereby adjusting the time between conduction intervals of the output driver thereby setting the duty cycle of the output driver.

8. A circuit for adapting the current flow of an output driver to protect the output driver, comprising:

a current sense circuit connected to sense an overcurrent condition in the current flow of the output driver;

a control circuit connected to the current sense circuit and connected to control the output driver to flow the current of the output driver at a given on-off duty-cycle upon sensing the overcurrent condition; and a thermal sense circuit connected to the control circuit, positioned to sense a rise in junction temperature of the output driver, and connected to cause the control circuit to flow the current of the output driver at a lower on-off duty cycle, less than the given on-off duty cycle, if the junction temperature rises above a trip of the thermal sense circuit during continuation of the sensed overcurrent condition.

9. The circuit of claim 8 wherein the control circuit includes a timing element to which the current sense circuit is connected that sets the conduction time of the output driver.

10. The circuit of claim 8 wherein the control circuit includes a timing element to which the current sense circuit is connected that sets the time between conduction intervals of the output driver.

11. The circuit of claim 8 wherein the timing element is a ripple counter.

12. The circuit of claim 8 wherein the thermal sense circuit has a first trip point that sets the output into a lower duty-cycle mode and has a second trip point so that when the junction temperature falls below it, the duty-cycle is returned to the higher duty cycle mode.

13. The circuit of claim 8 wherein the thermal sense circuit includes a circuit to sense the rise in junction temperature which continuously and linearly adjusts the duty cycle of the output driver by changing the period of a timing element which controls the conduction interval of the output driver.

14. The circuit of claim 8 wherein the thermal sense circuit includes a circuit to sense the rise in junction temperature which continuously and linearly adjusts the duty cycle of the output driver by changing the period of a timing element which controls the time between conduction intervals of the output driver.

* * * * *